United States Patent
Yoshida et al.

(10) Patent No.: US 10,301,974 B2
(45) Date of Patent: May 28, 2019

(54) ACTIVATION CONTROL APPARATUS FOR STEAM TURBINE

(71) Applicant: Mitsubishi Hitachi Power Systems, Ltd., Nishi-ku, Yokohama (JP)

(72) Inventors: Yasuhiro Yoshida, Tokyo (JP); Takuya Yoshida, Tokyo (JP); Tatsuro Yashiki, Tokyo (JP); Kazunori Yamanaka, Yokohama (JP); Fumiyuki Suzuki, Yokohama (JP); Norihiro Iyanaga, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 192 days.

(21) Appl. No.: 15/195,268

(22) Filed: Jun. 28, 2016

(65) Prior Publication Data

US 2017/0002690 A1  Jan. 5, 2017

(30) Foreign Application Priority Data

Jun. 30, 2015  (JP) ................ 2015-131753

(51) Int. Cl.
*F01K 7/16* (2006.01)
*F01D 17/10* (2006.01)
(Continued)

(52) U.S. Cl.
CPC ............ *F01K 7/165* (2013.01); *F01D 17/105* (2013.01); *F01D 17/145* (2013.01); *F01D 25/10* (2013.01);
(Continued)

(58) Field of Classification Search
CPC ................. F01K 13/00; F01K 13/02
See application file for complete search history.

(56) References Cited

U.S. PATENT DOCUMENTS

| | | | | |
|---|---|---|---|---|
| 4,187,685 A | * | 2/1980 | Tsuji | F01K 13/02 290/52 |
| 4,558,227 A | * | 12/1985 | Yanada | F22B 35/18 290/40 R |

(Continued)

FOREIGN PATENT DOCUMENTS

| | | |
|---|---|---|
| JP | 2013-144982 A | 7/2013 |
| JP | 2014-177929 A | 9/2014 |

(Continued)

OTHER PUBLICATIONS

Extended-European Search Report issued in counterpart European Application No. 16176933.6 dated Dec. 20, 2016 (8 pages).

(Continued)

*Primary Examiner* — Laert Dounis
(74) *Attorney, Agent, or Firm* — Crowell & Moring LLP (57) ABSTRACT

An activation control apparatus permits activating a steam turbine safely at high speed in response to a power generation plant state. A heat source apparatus heats low-temperature fluid to generate high-temperature fluid, and steam generation equipment generates steam by thermal exchange with the high-temperature fluid. A steam turbine is driven by the steam, and an adjustment apparatus adjusts a plant operation amount. A thermal effect amount prediction calculation device calculates a prediction value for a thermal effect amount for use for activation control of the steam turbine, and a changeover device decides, based on a state value of the power generation plant, the sensitivity of the thermal effect amount to a variation of the plant operation amount and outputs a changeover signal in accordance with the sensitivity. Based on the changeover signal, an adjustment device calculates the plant operation amount so as not to exceed a predetermined limit value.

7 Claims, 5 Drawing Sheets

(51) Int. Cl.
*F01D 17/14* (2006.01)
*F01D 25/10* (2006.01)
*F01K 13/02* (2006.01)

(52) U.S. Cl.
CPC ............... *F01K 7/16* (2013.01); *F01K 13/02* (2013.01); *F05D 2220/31* (2013.01); *F05D 2260/606* (2013.01); *Y02E 20/16* (2013.01)

(56) References Cited

U.S. PATENT DOCUMENTS

| | | | |
|---|---|---|---|
| 2006/0233637 A1* | 10/2006 | Yakushi | F01D 17/00 415/13 |
| 2009/0288416 A1* | 11/2009 | Matsumoto | F01D 19/02 60/646 |
| 2014/0260254 A1 | 9/2014 | Yoshida et al. | |
| 2014/0290249 A1* | 10/2014 | Yashiki | F01K 13/02 60/646 |
| 2014/0290250 A1* | 10/2014 | Yoshida | F01D 17/02 60/657 |
| 2014/0373540 A1 | 12/2014 | Kim et al. | |
| 2015/0121872 A1 | 5/2015 | Yashiki et al. | |
| 2015/0121874 A1 | 5/2015 | Yoshida et al. | |
| 2015/0135712 A1* | 5/2015 | Kim | F01K 13/02 60/660 |

FOREIGN PATENT DOCUMENTS

| | | |
|---|---|---|
| JP | 2014-190214 A | 10/2014 |
| JP | 2015-7380 A | 1/2015 |
| JP | 2015-90091 A | 5/2015 |
| JP | 2015-90132 A | 5/2015 |

OTHER PUBLICATIONS

Japanese-language Office Action issued in counterpart Japanese Application No. 2015-131753 dated Sep. 18, 2018 (six (6) pages).

* cited by examiner

ACTIVATION CONTROL APPARATUS FOR STEAM TURBINE

BACKGROUND OF THE INVENTION

1. Field of the Invention

The present invention relates to an activation control apparatus for a power generation plant including a steam turbine.

2. Description of the Related Art

In a power generation plant which uses renewable energy as represented by wind-power generation or photovoltaic power generation, the power generation amount obtained by renewable energy varies significantly depending upon the season, the weather or the like. Therefore, for a steam turbine provided in a power generation plant of the type described, reduction of activation time (high-speed activation) is demanded in order to stabilize the system power.

Since, in activation of a steam turbine, the temperature and the flow rate of steam which flows into the steam turbine increase rapidly, the temperature of the surface of a turbine rotor increases rapidly in comparison with that of the inside. As a result, the stress (thermal stress) arising from a temperature difference between the surface and the inside of the turbine rotor increases. Since excessive thermal stress may reduce the lifespan of the turbine rotor, upon activation of the steam turbine, it is necessary to control the input heat amount to the steam turbine such that the increased thermal stress may remain within a range of a limit value determined in advance. Further, upon activation of the steam turbine, the turbine rotor and a casing which accommodates the turbine rotor therein are exposed to and heated by high-temperature steam. Therefore, they are extended particularly in an axial direction of the turbine by thermal expansion (thermal extension). Since not only the structure but also the heat capacity are different between the turbine rotor and the casing, the thermal extension of the turbine rotor and the thermal extension of the casing become different from each other (thermal extension difference). If the thermal extension difference increases, then there is the possibility that the turbine rotor that is a rotary member and the casing that is a static body may be contacted with and damaged by each other. Therefore, it is necessary to control the input heat amount to the steam turbine such that the thermal extension difference may remain within a range of a limit value determined in advance. In this manner, since several constraint conditions to be taken into consideration are involved in activation of the steam turbine, it is necessary to perform activation control such that such constraint conditions are satisfied.

As an activation control method of the type described, a method is available in which, before starting of activation, a predetermined set of activation sequences each configured from a plurality of setting points is selected based on an activation mode and activation control of a steam turbine is performed from a setting point to a different setting point in accordance with the selected activation sequence (refer to JP-2013-144982-A and so forth).

SUMMARY OF THE INVENTION

Where a thermal effect amount such as thermal stress or a thermal extension difference which is a constraint condition for activation control of the steam turbine is controlled, it is necessary to adjust a plant operation amount such as the temperature (steam temperature) or the flow rate (steam flow rate) of steam to flow into the steam turbine. However, the sensitivity of a thermal effect amount to a variation of the steam temperature or the steam flow rate differs depending upon a state of a power generation plant, which continuously varies in an activation process, such as a temperature distribution in the inside of a metal arising from heat transmission delay or a temperature difference between components. Therefore, for example, where the sensitivity of a thermal effect amount to a variation of the steam temperature is high, if the variation of the steam temperature becomes excessively great, then there is the possibility that the thermal effect amount may exceed a range of a limit value. On the other hand, where the sensitivity is low, heat is less likely to transmit to components of the steam turbine, and, if the variation of the steam temperature is excessively small, then there is the possibility that time may be required more than necessary for activation of the steam turbine.

The present invention has been made in view of such a situation as described above, and it is an object of the present invention to provide an activation control apparatus by which a steam turbine can be activated safely at a high speed in response to a state of a power generation plant.

In order to attain the object described above, according to the present invention, there is provided an activation control apparatus for a power generation plant including a heat source apparatus configured to heat low-temperature fluid by a heat source medium to generate high-temperature fluid, steam generation equipment configured to generate steam by thermal exchange with the high-temperature fluid, a steam turbine configured to be driven by the steam, and an adjustment apparatus configured to adjust a plant operation amount. The activation control apparatus comprises: a thermal effect amount prediction calculation device configured to calculate a prediction value for at least one thermal effect amount to be used for activation control of the steam turbine; a changeover device configured to decide, based on a state value of the power generation plant, the sensitivity of the thermal effect amount to a variation of the plant operation amount and output a changeover signal for changing over a control mode for controlling the thermal effect amount in accordance with the sensitivity; and an adjustment device configured to calculate, based on the changeover signal, the plant operation amount such that the thermal effect amount does not exceed a limit value determined in advance.

With the present invention, an activation control apparatus can be provided by which a steam turbine can be activated at a high speed in safety in response to a state of a power generation plant.

DESCRIPTION OF THE PREFERRED EMBODIMENTS

<First Embodiment>
(Configuration)
1. Power Generation Plant

Figure 1:
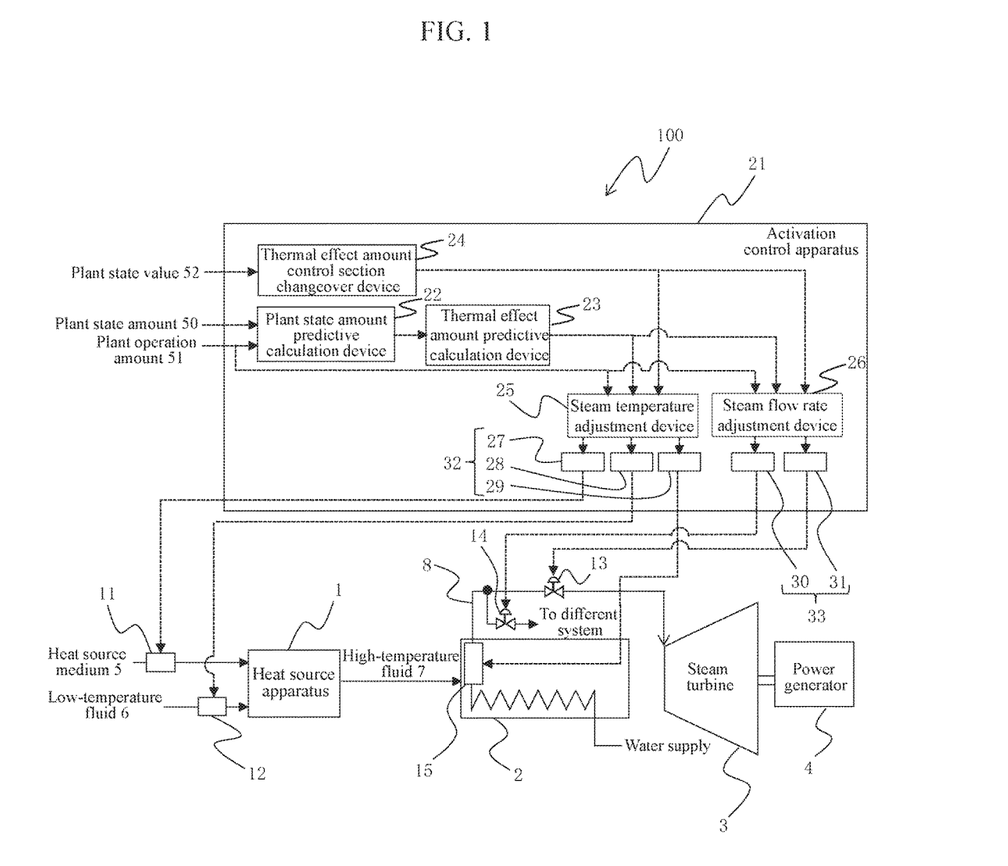
FIG. 1 is a schematic block diagram of a power generation plant according to a first embodiment of the present invention.

FIG. 1 is a schematic block diagram of a power generation plant according to a first embodiment of the present invention.

As depicted in FIG. 1, the power generation plant 100 includes a heat source apparatus 1, steam generation equipment 2, a steam turbine 3, a power generator 4, a heat source medium amount operation unit 11, a low-temperature fluid amount operation unit 12, a steam regulation valve 13, a bypass valve 14, a temperature adjustment unit 15 and an activation control apparatus 21. Further, though not depicted, also power generation equipment which generates electric power using renewable energy is included in the power generation plant 100. The present embodiment is described taking, as an example, a case in which the heat source apparatus 1 is a gas turbine (namely, a case in which the power generation plant is a combined cycle power generation plant).

The heat source apparatus 1 heats low-temperature fluid 6 (in the present embodiment, air used for combustion together with fuel) using a heat quantity maintained by a heat source medium 5 (in the present embodiment, fuel such as natural gas, hydrogen, or oil) to generate a high-temperature fluid 7 (in the present embodiment, gas turbine exhaust gas) and supplies the high-temperature fluid 7 to the steam generation equipment 2. The steam generation equipment 2 (in the present embodiment, an exhaust gas boiler) includes a heat exchanger in the inside thereof, and heats supplied water by heat exchange with potential heat of the high-temperature fluid 7 generated by the heat source apparatus 1 to generate steam 8. The steam turbine 3 is driven by the steam 8 generated by the steam generation equipment 2. The power generator 4 is coupled coaxially with the steam turbine 3 and converts driving force of the steam turbine 3 into electric power. The electric power of the power generator 4 is supplied, for example, to a power system (not depicted).

The heat source medium amount operation unit 11 (in the present embodiment, a fuel gas flow rate adjustment valve) is provided in a supplying path of the heat source medium 5 to the heat source apparatus 1. The heat source medium amount operation unit 11 adjusts the flow rate of the heat source medium 5 to be supplied to the heat source apparatus 1 to operate the retention heat quantity of the high-temperature fluid 7 generated by the heat source apparatus 1. The low-temperature fluid amount operation unit 12 (in the present embodiment, an inlet guide vane) is provided in a supplying path of the low-temperature fluid 6 to the heat source apparatus 1. The low-temperature fluid amount operation unit 12 adjusts the flow rate of the low-temperature fluid 6 to be supplied to the heat source apparatus 1 to perform a flow rate operation for the high-temperature fluid 7 to be supplied from the heat source apparatus 1 to the steam generation equipment 2. The steam regulation valve 13 is provided in a steam pipe system which couples the steam generation equipment 2 and the steam turbine 3 with each other to derive the steam 8 from the steam generation equipment 2. The steam regulation valve 13 operates the flow rate of the steam 8 to be supplied to the steam turbine 3. The bypass valve 14 is provided in a bypass system which is branched from the steam pipe system and discharges steam flowing in the steam pipe system to a different system. The bypass valve 14 controls the flow rate (bypass flow rate) of the steam 8 flowing in the bypass system. The temperature adjustment unit 15 is provided in the inside of the steam generation equipment 2. The temperature adjustment unit 15 supplies the heat medium to the steam pipe system of the steam generation equipment 2 to adjust the temperature of the steam 8 generated by the steam generation equipment 2. The heat source medium amount operation unit 11, low-temperature fluid amount operation unit 12, steam regulation valve 13, bypass valve 14 and temperature adjustment unit 15 function as an adjustment apparatus which adjusts a plant operation amount (hereinafter described).

A measurement value 50 of a plant state amount of the power generation plant 100, another measurement value 51 of a plant operation amount and so forth are inputted to the activation control apparatus 21. The plant state amount may be any amount which is used for calculation of a prediction value of a thermal effect amount, such as a steam temperature, a steam flow rate or a steam pressure at an entrance of the steam turbine or after a first stage of the steam turbine. The plant operation amount may be used for calculation of a prediction value of a plant state amount or another prediction value of a thermal effect amount, such as: an operation amount of the heat source medium amount operation unit 11, low-temperature fluid amount operation unit 12, steam regulation valve 13, bypass valve 14, or temperature adjustment unit 15; a rotational speed of and a load on the steam turbine 3; or a load on the heat source apparatus 1.

2. Activation Control Apparatus

The activation control apparatus 21 includes a plant state amount prediction calculation device 22, a thermal effect amount prediction calculation device 23, a thermal effect amount control unit changeover device (changeover device) 24, a steam temperature adjustment device (adjustment device) 25, a steam flow rate adjustment device (adjustment device) 26, a first instruction value calculation device 32 and a second instruction value calculation device 33. The components of the activation control apparatus 21 are described below.

2-1. Plate State Amount Prediction Calculation Device

The plant state amount prediction calculation device 22 receives, as an input thereto, at least one of the instrumentation value 50 of a plant state amount and the instrumentation value 51 of a plant operation amount. The plant state amount prediction calculation device 22 calculates a prediction value of a plant state amount in the future within a prediction period set in advance on the basis of the inputted instrumentation value 50 of a plant state amount and the instrumentation value 51 of a plant operation amount.

As a method for calculating a prediction value of a plant state amount in the future, an arbitrary publicly known prediction method can be used such as a publicly known model prediction control method which applies control engineering; a prediction method for calculating a prediction value by inputting an operation condition of a power generation plant in the future to a publicly known calculation model expression of the thermodynamics, hydrodynamics or heat-transfer engineering relating to a physical phenomenon regarding a constraint condition; a method for acquiring a variation rate of a plant operation amount in the future by referring to a table of such variation rates with process values representing states of a power generation plant; or a method for extrapolating a variation rate at present over a prediction period.

The prediction value of a plant state amount calculated by the plant state amount prediction calculation device 22 signifies a physical amount, which represents a thermal state of various plant components and is required for estimation of a value of a thermal effect amount, such as: a steam temperature, a steam flow rate and a steam pressure at the steam turbine entrance; a steam temperature, a steam flow rate and a steam pressure after the first stage of the steam turbine; or a heat transmissibility of steam. An example of a calculation procedure of a physical amount is described below.

Calculation of Steam Condition at Steam Turbine Entrance (Procedure A1)

A propagation procedure of heat and a substance supplied from the heat source apparatus 1 to the steam turbine 3 through the steam generation equipment 2 is calculated using a publicly known expression of energy balance or an expression of mass balance on the basis of operation amounts of the heat source medium amount operation unit 11 and low-temperature fluid amount operation unit 12 to calculate a temperature, a flow rate and an enthalpy at the steam turbine entrance. Then, using the flow rate and the temperature at the steam turbine entrance, a rated pressure value is corrected based on an expression for flow rate calculation at the speed of sound flow to calculate a pressure. It is to be noted that the pressure may be calculated by using a publicly known temperature correction method or a flow rate correction method for correcting a temperature variation or a flow rate variation at the steam turbine entrance for a reference value determined in advance.

Calculation of Steam Condition after First Stage of Steam Turbine (Procedure A2)

A pressure loss after the first stage of the steam turbine is subtracted from a pressure of main stream at the steam turbine entrance described above to obtain a pressure after the first stage of the steam turbine. The pressure loss is calculated, for example, based on steam turbine design information unique to the plant. Further, an inflow or outflow amount of steam to or from a different system is added to or subtracted from the flow rate of steam at the steam turbine entrance described above to obtain a flow rate after the first stage of the steam turbine. Further, a temperature after the first stage of the steam turbine is obtained from a steam characteristic function on the basis of the pressure after the first stage of the steam turbine and the enthalpy at the steam turbine entrance described above. Then, based on a synthesis flow rate of a rotor rotational speed and a flow rate of steam and a kinematic viscosity coefficient, a heat transmissibility between steam and the rotor after the first stage of the steam turbine is obtained using a publicly known heat transmissibility calculation expression. The kinematic viscosity is calculated from a steam characteristic function on the basis of the pressure and the temperature after the first stage of the steam turbine.

2-2. Thermal Effect Amount Prediction Calculation Device

The thermal effect amount prediction calculation device 23 receives, as an input thereto, a prediction value of the plant state amount calculated by the plant state amount prediction calculation device 22. The thermal effect amount prediction calculation device 23 calculates a prediction value in the future over a set prediction period to which at least one thermal effect amount, on the basis of the inputted prediction value of the plant state amount.

The thermal effect amount generally includes: thermal stress or a thermal extension difference in the turbine rotor of the steam turbine 3; thermal deformation of a cabin; and a temperature difference between structural locations relating to activation of the steam turbine 3, which relate to a metal temperature. The thermal effect amount is obtained with using a temperature distribution in the inside of metal, the temperature distribution being obtained through calculation of heat transmission from steam to the metal, on the basis of a result of the calculation in the procedure A2 described above. Specifically, the thermal stress of the turbine rotor is calculated based on the materials engineering law using a linear expansion coefficient, a Young's modulus, a Poisson's ratio and so forth, with using a temperature distribution in a radial direction of the turbine rotor, the temperature distribution being obtained through calculation of heat transmission from steam to the turbine rotor. The thermal extension difference of the turbine rotor is calculated based on the materials engineering law in which a linear expansion coefficient is used, with using temperatures at portions of the steam turbine divided, in an axial direction of the turbine rotor, the temperatures being obtained through calculation of heat transmission from steam to the turbine rotor and the cabin. The thermal deformation of the cabin is calculated based on the materials engineering law in which a linear expansion coefficient, a Young's modulus, a Poisson's ratio and so forth are used, with using a temperature distribution in the inside of the cabin, the temperature distribution being obtained through calculation of heat transmission from steam to the cabin, and in an axial direction of the cabin, a radial direction and a circumferential direction.

2-3. Thermal Effect Amount Control Unit Changeover Device

The thermal effect amount control unit changeover device 24 receives, as a input thereto, a state value (plant state value) 52 of the power generation plant 100. The thermal effect amount control unit changeover device 24 decides the sensitivity of the thermal effect amount to a variation of the plant operation amount on the basis of the inputted plant state value 52 and outputs a changeover signal for changing over the control mode for controlling the thermal effect amount in accordance with the decided sensitivity. In the present embodiment, where the plant state value 52 is equal to or lower than a set value determined in advance, the thermal effect amount control unit changeover device 24 decides that the sensitivity of the thermal effect amount to the variation of the plant operation amount is low and outputs a changeover signal for changing over the control mode for controlling the thermal effect amount to a first control mode. On the other hand, where the plant state value 52 is higher than the set value determined in advance, the thermal effect amount control unit changeover device 24 decides that the sensitivity of the thermal effect amount to the variation of the plant operation amount is high and outputs a changeover signal for changing over the control mode for controlling the thermal effect amount to a second control mode. It is to be noted that the plant state value 52 may be any parameter for estimating the sensitivity of the thermal effect amount to the variation of the plant operation amount, such as a temperature of the turbine rotor or the cabin, a temperature difference between steam and the turbine rotor, a temperature difference between steam and the cabin, a temperature difference between the surface and the center of the turbine rotor, a temperature difference between the turbine rotor and the cabin, a temperature difference between an upper half and a lower half of the cabin, a steam turbine load, a gas turbine load, thermal stress of the turbine rotor, a thermal extension difference between the turbine rotor and the cabin or an elapsed time period after activation.

2-4. Steam Temperature Adjustment Device

The steam temperature adjustment device 25 receives, as inputs thereto, the prediction value of the thermal effect amount calculated by the thermal effect amount prediction calculation device 23 and the changeover signal outputted from the thermal effect amount control unit changeover device 24. The steam temperature adjustment device 25 calculates a plant operation amount relating to a steam temperature (plant operation amount for the first instruction value calculation device 32) such that the thermal effect amount does not exceed a limit value determined in advance in a control mode (first or second control mode) in response to the inputted changeover signal. It is to be noted that the limit value is a set value set for a plant state amount from a point of view of protection of configuring equipment of the steam turbine within a period from starting to completion of the activation of the steam turbine. The operation amount relating to the steam temperature may be any parameter which has an influence on the steam temperature, such as an opening of the fuel gas flow rate adjustment valve (operation amount of the heat source medium amount operation unit 11), an opening of the inlet guiding vane (operation amount of the low-temperature fluid amount operation unit 12) and an opening of a spray flow rate adjustment valve of the temperature adjustment unit 15, a load on the heat source apparatus 1, a temperature of the high-temperature fluid 7, a gas turbine load, a gas turbine air intake flow rate and a spray flow rate to the steam 8 by the temperature adjustment unit 15, which vary through adjustment of the openings. An example of a calculation method of the plant operation amount of the steam temperature adjustment device 25 in the first and second control modes is described below.

First Control Mode

The steam temperature adjustment device 25 calculates a plant operation amount relating to a steam temperature, such as a gas turbine load such that the thermal effect amount calculated by the thermal effect amount prediction calculation device 23 does not exceed a limit value on the basis of the prediction value of the thermal effect amount. The plant operation amount is calculated in response to the difference between the prediction value and the limit value of the thermal effect amount, and is calculated, for example, by multiplying the difference between the prediction value and the limit value of the thermal effect amount by a coefficient set in advance.

Second Control Mode

The steam temperature adjustment device 25 calculates an operation amount relating to a steam temperature, such as a gas turbine load such that the steam temperature becomes equal to a set value set in advance. The set value is calculated, for example, by a method in which a plant operation amount at present is maintained or another method in which the plant operation amount at present is increased by a variation rate set in advance.

2-5. Steam Flow Rate Adjustment Device

The steam flow rate adjustment device 26 receives, as inputs thereto, the prediction value of the thermal effect amount calculated by the thermal effect amount prediction calculation device 23 and the changeover signal outputted from the thermal effect amount control unit changeover device 24. The steam flow rate adjustment device 26 calculates a plant operation amount relating to a steam flow rate (plant operation amount for the second instruction value calculation device 33) such that the thermal effect amount does not exceed a limit value set in advance in a control mode (first or second control mode) corresponding to the inputted changeover signal. The plant operation amount relating to the steam flow rate may be any parameter which has an influence on the steam flow rate, such as an opening of the steam regulation valve 13 or the bypass valve 14, an rotating speed of the steam turbine, a steam turbine load or a steam pressure. An example of a calculation method of a plant operation amount by the steam flow rate adjustment device 26 in the first or second control mode is described below.

First Control Mode

The steam flow rate adjustment device 26 calculates a plant operation amount relating to the steam flow rate such as an opening of the steam regulation valve 13 such that the steam flow rate may become equal to a set value set in advance. The set value is calculated, for example, by a method in which a plant operation amount at present is maintained or another method in which a plant operation amount at present is increased based on a variation rate set in advance.

Second Control Mode

The steam flow rate adjustment device 26 calculates a plant operation amount relating to a steam flow rate, such as an opening of the steam regulation valve 13 such that the thermal effect amount does not exceed a limit value on the basis of the prediction value of the thermal effect amount calculated by the thermal effect amount prediction calculation device 23. The plant operation amount is calculated in response to a difference between the prediction value of and the limit value of the thermal effect amount and is calculated, for example, by multiplying the difference between the prediction value of and the limit value of the thermal effect amount by a coefficient set in advance.

2-6. First Instruction Value Calculation Device

The first instruction value calculation device 32 includes a heat source medium amount operation state calculation device 27, a low-temperature fluid amount operation state calculation device 28 and a temperature adjustment unit operation state calculation device 29. The heat source medium amount operation state calculation device 27, low-temperature fluid amount operation state calculation device 28 and temperature adjustment unit operation state calculation device 29 calculate, based on the plant operation amount inputted from the steam temperature adjustment device 25, instruction values (operation state instruction values) for the heat source medium amount operation unit 11, low-temperature fluid amount operation unit 12 and temperature adjustment unit 15 such that the plant operation amount is satisfied. The heat source medium amount operation state calculation device 27, low-temperature fluid amount operation state calculation device 28 and temperature adjustment unit operation state calculation device 29 output the calculated operation state instruction values to the heat source medium amount operation unit 11, low-temperature fluid amount operation unit 12 and temperature adjustment unit 15, respectively.

2-7. Second Instruction Value Calculation Device

The second instruction value calculation device 33 includes a steam regulation valve operation state calculation device 30 and a bypass valve operation state calculation device 31. The steam regulation valve operation state calculation device 30 and the bypass valve operation state calculation device 31 calculate operation state instruction values for the steam regulation valve 13 and the bypass valve 14, respectively, such that the plant operation amount is satisfied on the basis of the plant operation amount inputted from the steam flow rate adjustment device 26. The steam regulation valve operation state calculation device 30 and the bypass valve operation state calculation device 31 output the calculated operation state instruction values to the steam regulation valve 13 and the bypass valve 14, respectively.

(Operation)

Figure 2:
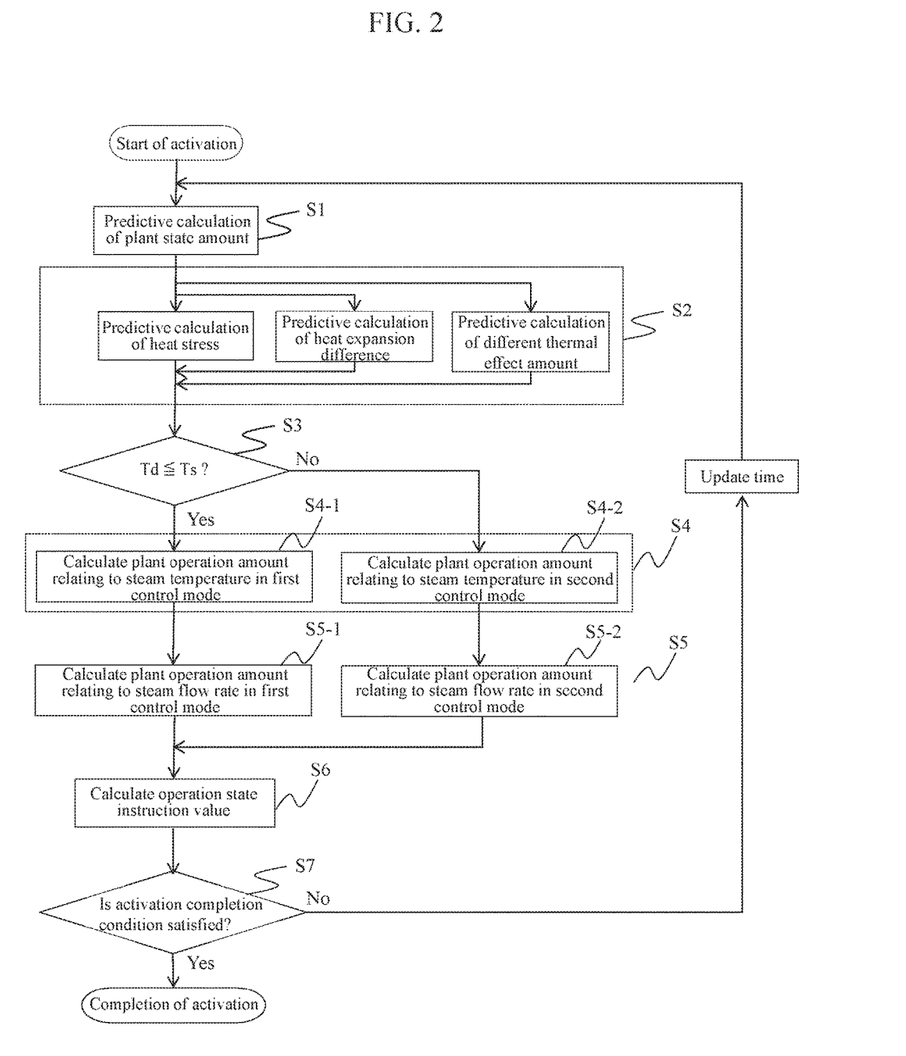
FIG. 2 is a flow chart illustrating a calculation procedure of an operation state instruction value.

FIG. 2 is a flow chart illustrating a calculation procedure of an operation state instruction value. The calculation procedure of the operation state instruction value is described below taking, as an example, a case in which the plant state value 52 is a value of a temperature difference between the surface and the center of the turbine rotor.

After the steam turbine 3 starts activation, the plant state amount prediction calculation device 22 receives, as input thereto, at least one of the instrumentation value 50 of the plant state amount and the instrumentation value 51 of the plant operation amount and calculates a prediction value of the plant state amount over a prediction period in the future set in advance (step S1). The thermal effect amount prediction calculation device 23 receives, as a input thereto, a prediction value of the plant state amount calculated by the plant state amount prediction calculation device 22 and calculates prediction values of the thermal stress, the thermal extension difference and some other thermal effect amount (step S2).

The thermal effect amount control unit changeover device 24 receives, as an input thereto, a temperature difference Td between the surface and the center of the turbine rotor and decides whether or not the temperature difference Td is equal to or lower than a set value Ts determined in advance (step S3). If the temperature Td is equal to or smaller than the setting value Ts (Yes), then the thermal effect amount control unit changeover device 24 decides that the sensitivity of the thermal effect amount to a variation of the steam temperature is low and outputs a changeover signal for changing over the control mode to the first control mode. On the other hand, if the temperature difference Td is greater than the set value Ts (No), then the thermal effect amount control unit changeover device 24 decides that the sensitivity of the thermal effect amount to a variation of the steam temperature is high and outputs a changeover signal for changing over the control mode to the second control mode.

Then, the steam temperature adjustment device 25, receives, as inputs thereto, the prediction value of the thermal effect amount calculated by the thermal effect amount prediction calculation device 23 and the changeover signal outputted from the thermal effect amount control unit changeover device 24 and calculates a plant operation amount relating to the steam temperature in the control mode in accordance with the changeover signal (step S4). In particular, if the changeover signal for changing over the control mode to the first control mode is inputted, then the steam temperature adjustment device 25 calculates a plant operation amount relating to the steam temperature in the first control mode (step S4-1). On the other hand, if the changeover signal for changing over the control mode to the second control mode is inputted, then the steam temperature adjustment device 25 calculates a plant operation amount relating to the steam temperature in the second control mode (step S4-2).

The steam flow rate adjustment device 26 receives, as inputs thereto, the prediction value of the thermal effect amount calculated by the thermal effect amount prediction calculation device 23 and the changeover signal outputted from the thermal effect amount control unit changeover device 24 and calculates a plant operation amount relating to the steam flow rate in the control mode in accordance with the changeover signal (step S5). In particular, if the changeover signal for changing over the control mode to the first control mode is inputted, then the steam flow rate adjustment device 26 calculates a plant operation amount relating to the steam flow rate in the first control mode (step S5-1). On the other hand, if the changeover signal for changing over the control mode to the second control mode is inputted, then the steam flow rate adjustment device 26 calculates a plant operation amount relating to the steam flow rate in the second control mode (step S5-2).

The first and second instruction value calculation devices 32 and 33 calculate an operation state instruction value on the basis of the plant operation amounts calculated by the steam temperature adjustment device 25 and the steam flow rate adjustment device 26 and output the calculated instruction value to the adjustment apparatus (step S6).

Thereafter, the activation control apparatus 21 decides whether or not the activation completion condition of the plant is satisfied, namely, whether or not activation of the plant is completed (step S7). If the activation completion condition is satisfied (Yes), then the activation control apparatus 21 ends the procedures of steps S1 to S6. On the other hand, if the activation completion condition of the plant is not satisfied (No), then the activation control apparatus 21 updates the time and repetitively executes the procedure of steps S1 to S6.

(Effect)

In the present embodiment, the control mode is changed over and the plant operation amount is calculated in response to the sensitivity of the thermal effect amount to a variation of the plant operation amount. In particular, where the sensitivity of the thermal effect amount to a variation of the plant operation amount is low, the plant operation amount relating to the steam temperature is calculated such that the thermal effect amount does not exceed the limit value and the plant operation amount relating to the steam flow rate is calculated such that the steam flow rate becomes equal to the set value determined in advance. On the other hand, where the sensitivity is high, the plant operation amount relating to the steam temperature is calculated such that the steam temperature becomes equal to the set value determined in advance and the plant operation amount relating to the steam flow rate is calculated such that the thermal effect amount does not exceed the limit value. Therefore, where the sensitivity of the thermal effect amount to a variation of the steam temperature is so high that the possibility is high that the thermal effect amount may exceed the limit value, the steam flow rate can be adjusted preferentially and the thermal effect amount can be controlled in stability. Further, where the sensitivity is so low that heat transmission to the components of the steam turbine is less likely to proceed, the steam temperature can be adjusted preferentially and heat transmission to the components can be promoted to reduce the activation time period of the steam turbine.

Figure 3:
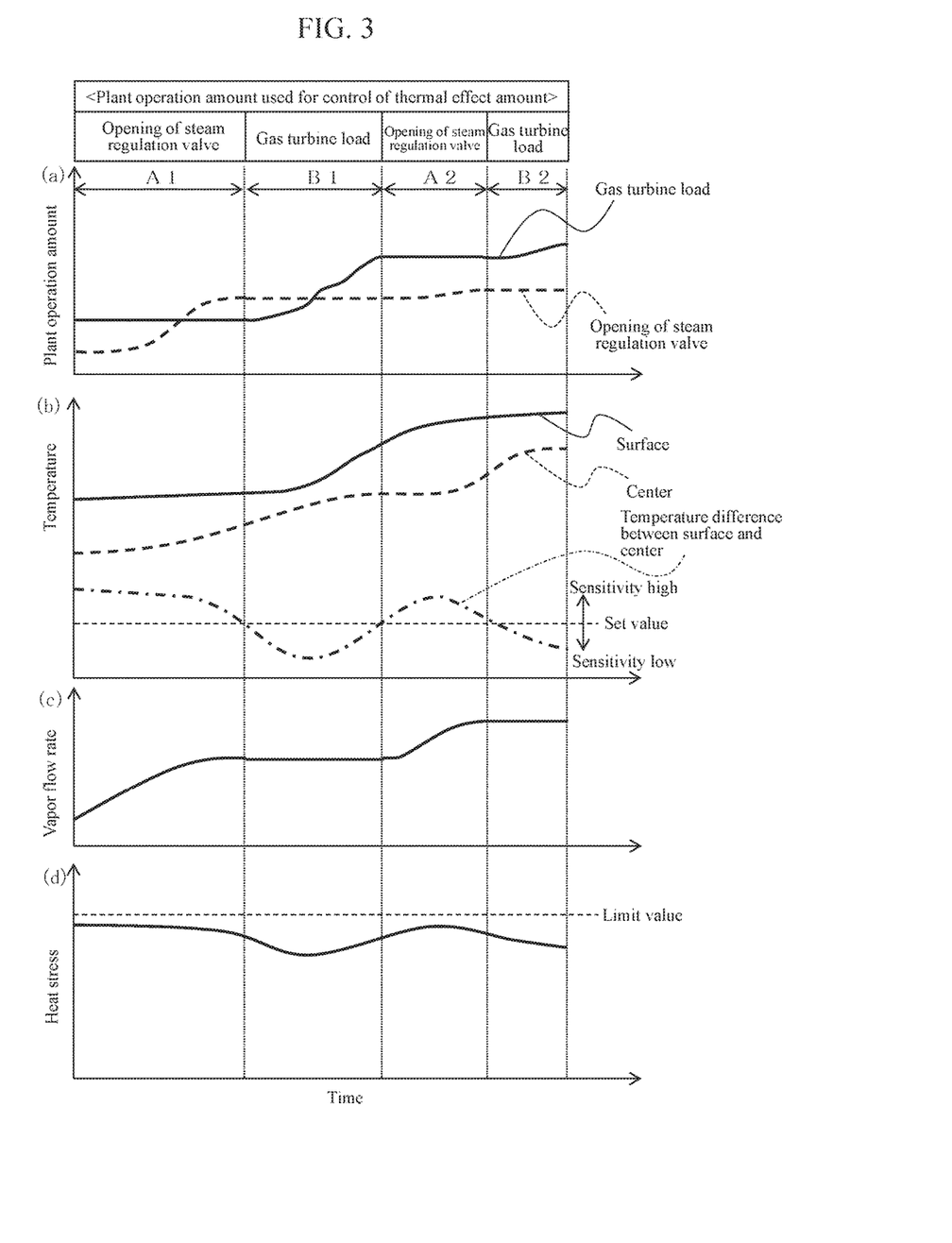
FIG. 3 is a time chart illustrating part of an activation sequence according to the first embodiment of the present invention.

FIGS. 3(a) to 3(c) are views exemplifying part of an activation sequence according to the present embodiment. FIG. 3(a) depicts transition of the plant operation amounts where the plant operation amount relating to the steam temperature and the plant operation amount relating to the steam flow rate are set to the gas turbine load and the opening of the steam regulation valve, respectively. In FIG. 3(a), the axis of abscissa indicates time and the axis of ordinate indicates the plant operation amount, and a solid line curve and a broken line curve indicate the gas turbine load and the opening of the steam regulation valve, respectively. FIG. 3(b) depicts transition of a plant state value where the plant state value is set to the temperature difference between the surface and the center of the turbine rotor. In FIG. 3(b), the axis of abscissa indicates the time and the axis of ordinate indicates the temperature, and a solid line curve and a broken line curve indicate the temperature at the surface and the temperature at the center, respectively. Further, an alternate long and short dash line of FIG. 3(b) indicates the temperature difference between the surface and the center. FIG. 3(c) depicts transition of a steam flow rate and FIG. 3(d) depicts transition of thermal stress. In FIGS. 3(c) and 3(d), the axis of abscissa indicates the time and the axis of ordinate indicates a steam flow rate and thermal stress, respectively.

As depicted in FIG. 3(b), within periods A1 and A2 in which the temperature difference between the surface and the center of the turbine rotor is greater than the set value determined in advance, it is decided that the sensitivity of the thermal effect amount to the variation of the steam temperature is high, and the gas turbine load is maintained in accordance with the second control mode to control the opening of the steam regulation valve such that the thermal stress does not exceed the limit value (FIGS. 3(a), 3(c) and 3(d)). Since, within the periods A1 and A2, the temperature at the surface and the center of the turbine rotor is controlled to such a degree that it rises with a delay by heat transfer toward an integer fixed point corresponding to the gas turbine load, the thermal stress does not vary suddenly. Further, the delay time by heat transfer decreases as the steam flow rate increases but increases as the steam flow rate decreases, and therefore can be controlled by the opening of the steam regulation valve. Accordingly, by controlling the opening of the steam regulation valve within a period within which the sensitivity of the thermal effect amount to the variation of the steam temperature is high, the thermal stress can be controlled in safety and with a high efficiency. Further, if the steam flow rate increases in the state in which the steam temperature is held low as in the period A1, then the steam turbine load can be increased early and the power generation efficiency upon activation of the steam turbine can be improved.

On the other hand, as depicted in FIG. 3(b), within periods B1 and B2 within which the temperature difference between the surface and the center of the turbine rotor is smaller than the set value determined in advance, it is decided that the sensitivity of the thermal effect amount to the variation of the steam temperature is low. Thus, the opening of the steam regulation valve is controlled in accordance with the first control mode such that the steam flow rate is fixed to control the gas turbine load such that the thermal stress does not exceed the limit value (FIGS. 3(a), 3(c) and 3(d)). Within the period B1 and B2, there is a margin to the limit value of the thermal stress, and therefore, the gas turbine load, namely, the steam temperature, is controlled so as to rise. Accordingly, the heat transfer to the turbine rotor is promoted such that the value of the thermal stress or some other thermal effect amount rises to a value in the proximity of the limit value, and the activation time period of the steam turbine can be reduced.

<Second Embodiment>
(Configuration)

Figure 4:
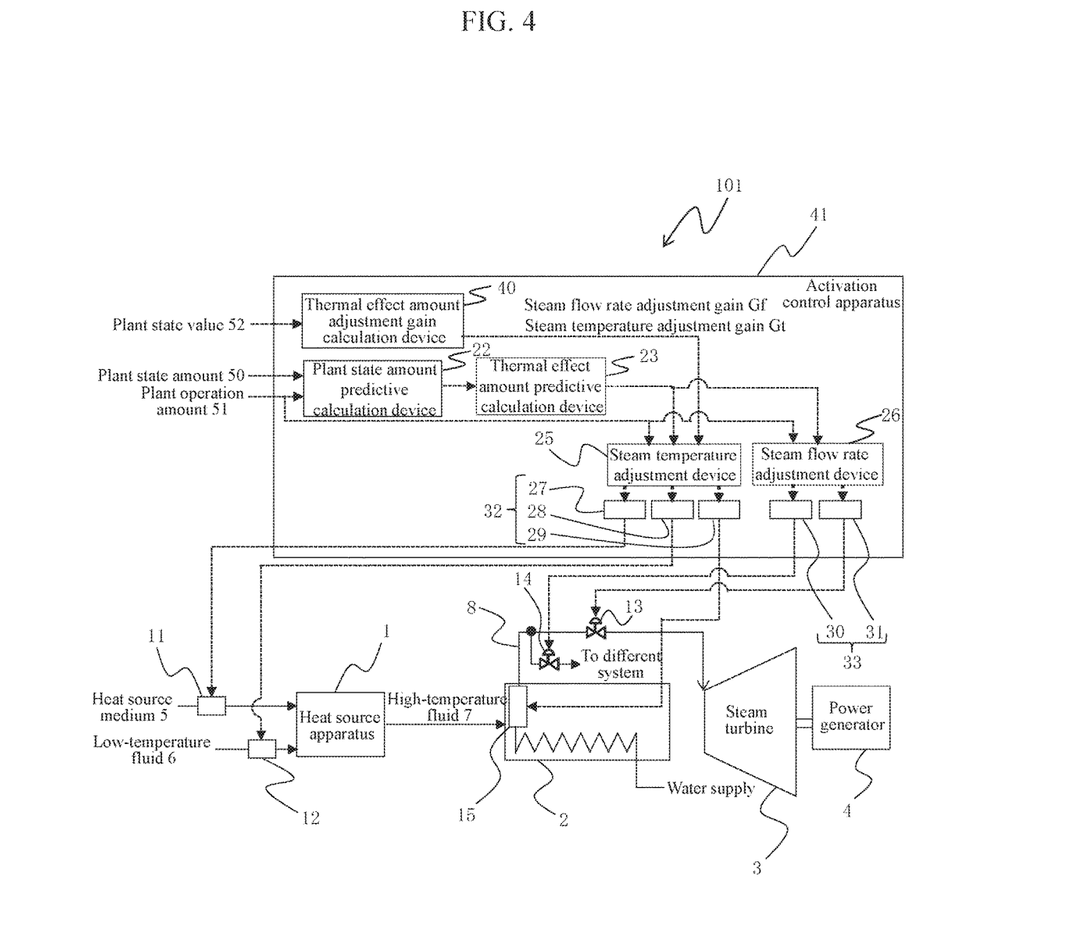
FIG. 4 is a schematic block diagram of a power generation plant according to a second embodiment of the present invention.

FIG. 4 is a schematic block diagram of a power generation plant according to a second embodiment of the present invention. In FIG. 4, like elements to those in the first embodiment described hereinabove are denoted by like reference characters, and overlapping description of them is omitted herein to avoid redundancy.

An activation control apparatus 41 of a power generation plant 101 according to the present embodiment is different from the activation control apparatus 21 of the power generation plant 100 of the first embodiment in that it includes a thermal effect amount adjustment gain calculation device 40 in place of the thermal effect amount control unit changeover device 24. Thus, the activation control apparatus 41 is different also in that a steam temperature adjustment device 25 and a steam flow rate adjustment device 26 calculate a plant operation amount using an adjustment gain calculated by the thermal effect amount adjustment gain calculation device 40. The configuration of the other part of the power generation plant 101 is similar to that in the first embodiment.

As depicted in FIG. 4, the thermal effect amount adjustment gain calculation device 40 receives a plant state value 52 as an input thereto. The thermal effect amount adjustment gain calculation device 40 decides the sensitivity of the thermal effect amount to the variation of the plant operation amount on the basis of the inputted plant state value 52 and calculates a steam temperature adjustment gain Gt and a steam flow rate adjustment gain Gf for setting a weighting value to be used for the control of the thermal effect amount in response to the decided sensitivity. The steam temperature adjustment gain Gt is used for adjustment of the variation rate of the steam temperature, and the steam flow rate adjustment gain Gf is used for adjustment of the variation rate of the steam flow rate.

The steam temperature adjustment device 25 receives, as inputs thereto, a prediction value of the thermal effect amount calculated by the thermal effect amount prediction calculation device 23 and the steam temperature adjustment gain Gt calculated by the thermal effect amount adjustment gain calculation device 40 and calculates a plant operation amount relating to the steam temperature. Meanwhile, the steam flow rate adjustment device 26 receives, as inputs thereto, a prediction value of the thermal effect amount calculated by the thermal effect amount prediction calculation device 23 and the steam flow rate adjustment gain Gf calculated by the thermal effect amount adjustment gain calculation device 40 and calculates a plant operation amount relating to the steam flow rate.

(Operation)

Figure 5:
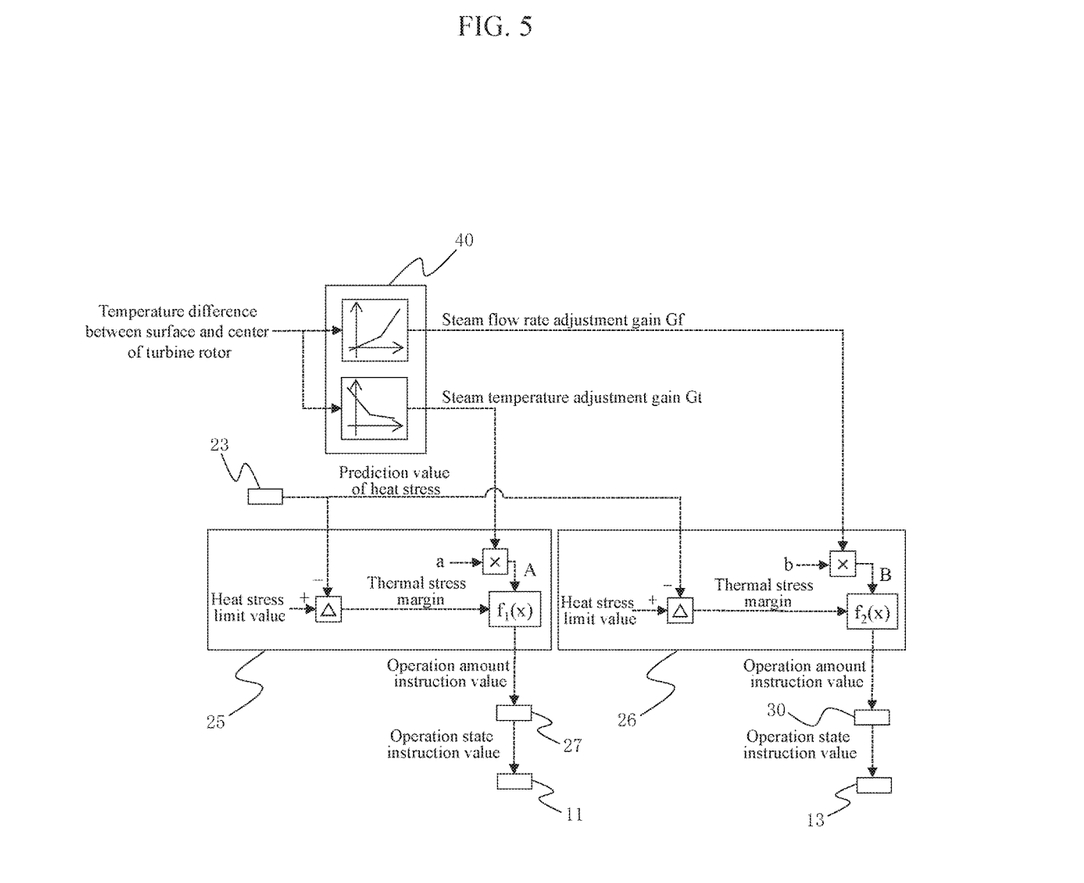
FIG. 5 is a block diagram illustrating a calculation procedure of an operation state instruction value.

FIG. 5 is a view illustrating a calculation procedure of an operation state instruction value. In the following, the calculation procedure of an operation state instruction value is described taking, as an example, a case in which the thermal effect amount calculated by the thermal effect amount prediction calculation device 23 is thermal stress; the plant operation amount calculated by the steam temperature adjustment device 25 is a gas turbine load; the plant operation amount calculated by the steam flow rate adjustment device 26 is a steam turbine load and the plant state value 52 is a thermal difference between the surface and the center of the turbine rotor. It is to be noted that the thermal effect amount calculated by the thermal effect amount prediction calculation device 23 is not limited to thermal stress and two or more thermal effect amounts relating to activation of the steam turbine may be calculated. Further, the plant operation amount calculated by the steam temperature adjustment device 25 is not limited to the gas turbine load and two or more plant operation amounts relating to the steam temperature may be calculated. Further, the plant operation amount calculated by the steam flow rate adjustment device 26 is not limited to the steam turbine load and two or more plant operation amount relating to the steam flow rate may be calculated. Further, the plant state value 52 may be some other value only if it makes an index for estimating the sensitivity of the thermal effect amount to the variation of the steam temperature.

As depicted in FIG. 5, the thermal effect amount adjustment gain calculation device 40 receives, as an input thereto, a temperature difference between the surface and the center of the turbine rotor and calculates a steam temperature adjustment gain Gt and a steam flow rate adjustment gain Gf. The steam temperature adjustment gain Gt is calculated such that it has a value which increases as the temperature difference between the surface and the center of the turbine rotor decreases (in other words, as the sensitivity of the thermal stress to the variation of the steam temperature decreases) but decreases as the temperature difference increase (in other words, as the sensitivity of the thermal stress to the variation of the steam temperature increases). The steam flow rate adjustment gain Gf is calculated such that, in order to prevent interference thereof with the steam temperature adjustment gain Gt thereby to prevent thermal stress control from being made oscillatory, it has a value which is low in a region in which the steam temperature adjustment gain Gt is great but is high in a different region in which the steam temperature adjustment gain Gt is small. It is to be noted that the steam temperature adjustment gain Gt and the steam flow rate adjustment gain Gf are calculated, for example, based on a numerical table stored in advance in a storage unit (not depicted).

The steam temperature adjustment device 25 receives, as inputs thereto, a prediction value of the thermal stress calculated by the thermal effect amount prediction calculation device 23 and a limit value of the thermal stress stored in advance in the storage unit and calculates a thermal stress margin by subtracting the prediction value of the thermal stress from the limit value of the thermal stress. Further, the steam temperature adjustment device 25 multiplies a steam temperature calculation parameter a before correction stored in advance in the storage unit by a steam temperature adjustment gain Gt calculated by the thermal effect amount adjustment gain calculation device 40 to obtain a steam temperature calculation parameter (weighting value) A after the correction. Then, the steam temperature adjustment device 25 calculates a plant operation amount relating to the gas turbine load on the basis of the thermal stress margin and the steam temperature calculation parameter A after the correction. The plant operation amount relating to the gas turbine load is obtained, for example, by multiplying the thermal stress margin by the steam temperature calculation parameter A after the correction using the steam temperature calculation parameter A after the correction as a coefficient for converting the thermal stress margin into an instruction value relating to the gas turbine load.

The steam flow rate adjustment device 26 calculates a thermal stress margin similarly to the steam temperature adjustment device 25. Further, the steam flow rate adjustment device 26 multiplies a steam flow rate calculation parameter b before correction stored in advance in the storage unit by a steam flow rate adjustment gain Gf calculated by the thermal effect amount adjustment gain calculation device 40 to obtain a steam flow rate calculation parameter (weighting value) B after the correction. Then, the steam flow rate adjustment device 26 calculates a plant operation amount relating to the steam turbine load on the basis of the thermal stress margin and the steam flow rate calculation parameter B after the correction. The plant operation amount relating to the steam turbine load is obtained, for example, by multiplying the thermal stress margin by the steam flow rate calculation parameter B after the correction using the steam flow rate calculation parameter B after the correction as a coefficient for converting the thermal stress margin into a steam turbine load instruction.

The heat source medium amount operation state calculation device 27 calculates an operation state instruction value for the heat source medium amount operation unit 11 on the basis of the plant operation amount inputted thereto from the steam temperature adjustment device 25 and outputs the calculated operation state instruction value to the heat source medium amount operation unit 11. The steam regulation valve operation state calculation device 30 calculates an operation state instruction value for the steam regulation valve 13 on the basis of the plant operation amount inputted thereto from the steam flow rate adjustment device 26 and outputs the calculated operation state instruction value to the steam regulation valve 13.

(Effect)

In the present embodiment, the steam temperature adjustment gain Gt and the steam flow rate adjustment gain Gf are calculated in response to the sensitivity of the thermal effect amount to the variation of the plant operation amount, and a plant operation amount is calculated using a weighting value calculated based on the steam temperature adjustment gain Gt and the steam flow rate adjustment gain Gf. In particular, the steam temperature adjustment gain Gt is calculated such that it has a value which increases as the sensitivity of the thermal effect amount to the variation of the steam temperature decreases but decreases as the sensitivity increases. Meanwhile, the steam flow rate adjustment gain Gf is calculated such that it has a low value in a region in which the steam temperature adjustment gain Gt is great but has a high value in another region in which the steam temperature adjustment gain Gt is small. Therefore, in a region in which the sensitivity of the thermal effect amount to the variation of the steam temperature is great and therefore the possibility that the thermal effect amount may exceed a limit value therefor is high, the steam temperature adjustment gain Gt is calculated to a low value and the steam flow rate adjustment gain Gf is calculated to a high value, thereby the thermal effect amount can be controlled in safety and efficiently by preferentially adjusting the steam flow rate with respect to the steam temperature. Further, the steam temperature and the steam flow rate can be increased simultaneously in both of a region in which the sensitivity of the thermal effect value to the variation of the steam temperature is high and another region in which the sensitivity is low. Therefore, the value of the thermal effect amount can be increased to a value close to the limit value within a range within which the value does not exceed the limit value. Accordingly, an unnecessary waiting time period can be reduced, and the steam turbine can be activated at a higher rate as much.

<Others>

The present invention is not limited to the embodiments described above but embraces various modifications. For example, the embodiments described above are described in detail above in order to facilitate understandings of them and the invention is not limited to those which include all features described hereinabove. For example, some component of the embodiments may be deleted.

In the embodiments described above, the power generation plant exemplifies a configuration which includes the heat source medium amount operation unit 11, low-temperature fluid amount operation unit 12, steam regulation valve 13, bypass valve 14 and temperature adjustment unit 15 as adjustment apparatus. However, the essential advantageous effect of the present invention resides in provision of an activation control apparatus which can activate a steam turbine at a high speed in safety in response to a state of the power generation plant. Thus, as far as the essential advantageous effect is achieved, the activation control apparatus is not necessarily limited to the configuration described hereinabove. For example, the activation control apparatus may include a new component as an adjustment apparatus.

Further, the activation control apparatus according to the present invention can be applied not only to a combined cycle power generation plant but also to all plants which include a steam turbine such as a steam-power generation plant or a solar power generation plant.

For example, where the activation control apparatus according to the present invention is applied to a steam-power generation plant, in the configurations of FIGS. 1 and 4, coal or natural gas can be adopted for the heat source medium; a fuel flow control value can be adopted for the heat source medium amount operation unit 11; air or oxygen can be adopted for the low-temperature fluid; an air flow control valve can be adopted for the low-temperature fluid amount operation unit 12; furnace in a boiler can be adopted for the heat source apparatus 1; combustion gas can be adopted for the high-temperature fluid; and a heat transfer unit (steam generation unit) in the boiler can be adopted for the steam generation equipment 2.

Further, where the activation control apparatus according to the present invention is applied to a solar power generation plant, in the configurations of FIGS. 1 and 4, solar light can be adopted for the heat source medium; a driving apparatus for a heat collection panel can be adopted for the heat source medium amount operation unit 11; a medium which converts and retains solar energy such as oil or high temperature solvent salt can be adopted for the low-temperature fluid and the high-temperature fluid; a flow rate control valve for oil, high temperature solvent salt or the like can be adopted for the low-temperature fluid amount operation unit 12; a heat collection panel can be adopted for the heat source apparatus 1; and equipment for heating supply water to steam by heat exchange with the high-temperature fluid can be adopted for the steam generation equipment 2.

Further, where the activation control apparatus according to the present invention is applied to a power plant which includes a combination of a fuel cell and a steam turbine, in the configurations of FIGS. 1 and 4, fuel gas such as carbon monoxide or hydrogen can be adopted for the heat source medium; a fuel gas flow rate control value can be adopted for the heat source medium amount operation unit 11; air can be adopted for the low-temperature fluid; an air flow control valve can be adopted for the low-temperature fluid amount operation unit 12; a fuel cell can be adopted for the heat source apparatus 1; fuel cell exhaust gas can be adopted for the high-temperature fluid; and an exhaust heat recovery boiler can be adopted for the steam generation equipment 2.

DESCRIPTION OF THE REFERENCE CHARACTERS

1: Heat source apparatus
2: Steam generation equipment
3: Steam turbine
5: Heat source medium
6: Low-temperature fluid
7: High-temperature fluid
8: Steam
11: Heat source medium amount operation unit (adjustment apparatus)
12: Low-temperature fluid amount operation unit (adjustment apparatus)
13: Steam regulation valve (adjustment apparatus)
14: Bypass valve (adjustment apparatus)
15: Temperature adjustment unit (adjustment apparatus)
21, 41: Activation control apparatuses
23: Thermal effect amount prediction calculation device
24: Thermal effect amount control unit changeover device (changeover device)
25: Steam temperature adjustment device (adjustment device)
26: Steam flow rate adjustment device (adjustment device)
40: Thermal effect amount adjustment gain calculation device (gain calculation device)
100, 101: Power generation plants

What is claimed is:

1. An activation control apparatus for a power generation plant including:
a heat source apparatus configured to heat low-temperature fluid by a heat source medium to generate high-temperature fluid;
steam generation equipment configured to generate steam by thermal exchange with the high-temperature fluid;
a steam turbine configured to be driven by the steam; and
a first adjustment apparatus configured to adjust a first plant operation amount relating to a temperature of the steam,
a second adjustment apparatus configured to adjust a second plant operation amount relating to a flow rate of the steam, the activation control apparatus comprising:
a thermal effect amount prediction calculation device configured to calculate a prediction value for at least one thermal effect amount to be used for activation control of the steam turbine;
a changeover device configured to compare a plant state value of the power generation plant with a set value determined in advance, decide, based on a comparison result between the plant state value and the set value, a sensitivity of the thermal effect amount to a variation of the first and second plant operation amounts and output a changeover signal for changing over a control mode for controlling the thermal effect amount in accordance with the sensitivity; and
an adjustment device configured to calculate based on the changeover signal, wherein:
the adjustment device includes a steam temperature adjustment device configured to calculate the first plant operation amount, and a steam flow rate adjustment device configured to calculate the second plant operation amount;
where the plant state value is equal to or lower than the set value, the changeover device outputs a changeover signal for changing over the control mode to a first control mode, and where the plant state value is higher than the set value, the changeover device outputs a changeover signal for changing over the control mode to a second control mode,
when the control mode is the first control mode, the steam temperature adjustment device calculates the first plant operation amount such that the thermal effect amount does not exceed a limit value of the first plant operation amount and controls the first adjustment apparatus based on the calculated first plant operation amount, and the steam flow rate adjustment device calculates the second plant operation amount such that the steam flow rate may become equal to the set value and controls the second adjustment apparatus based on the calculated second plant operation amount, and
when the control mode is the second control mode, the steam temperature adjustment device calculates the first plant operation amount such that the steam temperature becomes equal to the set value and controls the first adjustment apparatus based on the calculated first plant operation amount, and the steam flow rate adjustment device calculates the second plant operation amount such that the thermal effect amount does not exceed a limit value of the second plant operation amount and controls the second adjustment apparatus based on the calculated second plant operation amount.

2. The activation control apparatus according to claim 1, wherein the adjustment apparatus includes a heat source medium amount operation unit configured to adjust a heat source medium amount to be supplied to the heat source apparatus and operate a heat amount held by the high-temperature fluid, and a steam regulation valve configured to operate a flow rate of steam to be supplied to the steam turbine.

3. The activation control apparatus according to claim 1, wherein the thermal effect amount includes at least one of thermal stress, thermal expansion difference and a temperature difference between different structural portions.

4. The activation control apparatus of the steam turbine power generation plant according to claim 2, further comprising:
a low-temperature fluid amount operation unit configured to adjust a flow rate of the low-temperature fluid to perform a flow rate operation for the high-temperature fluid to be supplied from the heat source apparatus to the steam generation equipment; and
a temperature adjustment unit configured to supply a heat medium to a steam pipe system of the steam generation equipment to adjust a temperature of the steam;
wherein the steam temperature adjustment device calculates at least one multiple amounts as the first plant operation amount, the multiple amounts including an operation amount of the heat source medium amount operation unit, an operation amount of the low-temperature fluid amount operation unit, an operation amount of the temperature adjustment unit, the load on the heat source apparatus, the temperature of the high-temperature fluid and a spray flow rate to the steam in the temperature adjustment unit.

5. The activation control apparatus according to claim 2, further comprising:
a bypass system branched from a steam pipe system which connects the steam generation equipment and the steam turbine to each other and configured to exhaust the steam to a different system; and
a bypass valve configured to control a flow rate of the steam to the bypass system;
wherein the steam flow rate adjustment device calculates at least one of multiple amounts as the second plant operation amount, the amounts including an opening of the steam regulation valve, an opening of the bypass valve, a rotating speed of the steam turbine and the load on the steam turbine.

6. The activation control apparatus according to claim 1, wherein the changeover device outputs the changeover signal based on at least one parameter for estimating the sensitivity of the thermal effect amount to a temperature variation of the steam.

7. An activation control apparatus for a power generation plant, including:
a heat source apparatus configured to heat low-temperature fluid by a heat source medium to generate high-temperature fluid;
steam generation equipment configured to generate steam by thermal exchange with the high-temperature fluid;
a steam turbine configured to be driven by the steam; and
a first adjustment apparatus configured to adjust a first plant operation amount relating to a temperature of the steam,
a second adjustment apparatus configured to adjust a second plant operation amount relating to a flow rate of the steam, the activation control apparatus comprising:
a thermal effect amount prediction calculation device configured to calculate a prediction value for at least one thermal effect amount to be used for activation control of the steam turbine;
a gain calculation device configured to compare a plant state value of the power generation plant with a set value determined in advance, decide, based on a comparison result between the plant state value and the set value, a sensitivity of the thermal effect amount to a variation of the first and second plant operation amounts and calculate a weighting value to be used for control of the thermal effect amount in response to the sensitivity; and
an adjustment device configured to calculate using the weighting value, wherein:
the adjustment device includes a steam temperature adjustment device configured to calculate the first plant operation amount and a steam flow rate adjustment device configured to calculate the second plant operation amount;
where the plant state value is equal to or lower than the set value, the gain calculation device outputs a first signal for changing over the control mode to a first control mode, and where the plant state value is higher than the set value, the gain calculation device outputs a second signal for changing over the control mode to a second control mode,
when the control mode is the first control mode, the steam temperature adjustment device calculates the first plant operation amount such that the thermal effect amount does not exceed a limit value of the first plant operation amount and controls the first adjustment apparatus based on the calculated first plant operation amount, and the steam flow rate adjustment device calculates the second plant operation amount such that the steam flow rate may become equal to the set value and controls the second adjustment apparatus based on the calculated second plant operation amount, and
when the control mode is the second control mode, the steam temperature adjustment device calculates the first plant operation amount such that the steam temperature becomes equal to the set value and controls the first adjustment apparatus based on the calculated first plant operation amount, and the steam flow rate adjustment device calculates the second plant operation amount such that the thermal effect amount does not exceed a limit value of the second plant operation amount and controls the second adjustment apparatus based on the calculated second plant operation amount.

* * * * *